April 15, 1958   J. MORKOSKI ET AL   2,830,422
MOUNTING AND LIFTING MEANS FOR A TRACTOR MOUNTED MOWER
Filed Aug. 1, 1955   3 Sheets-Sheet 1

INVENTORS
JAMES MORKOSKI
SAMUEL E. HILBLOM

Paul O. Pippel
ATTORNEY

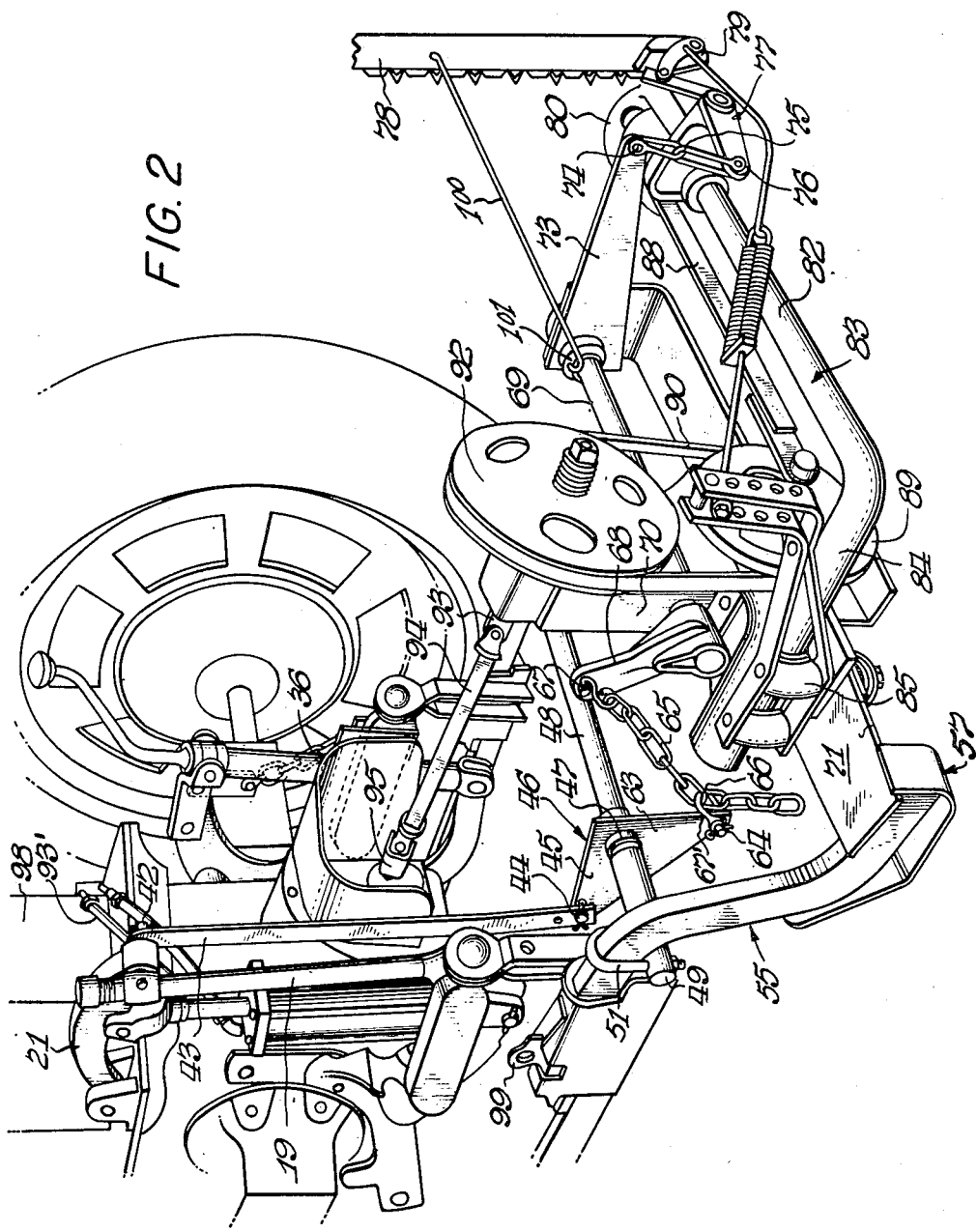

April 15, 1958    J. MORKOSKI ET AL    2,830,422
MOUNTING AND LIFTING MEANS FOR A TRACTOR MOUNTED MOWER
Filed Aug. 1, 1955    3 Sheets-Sheet 3
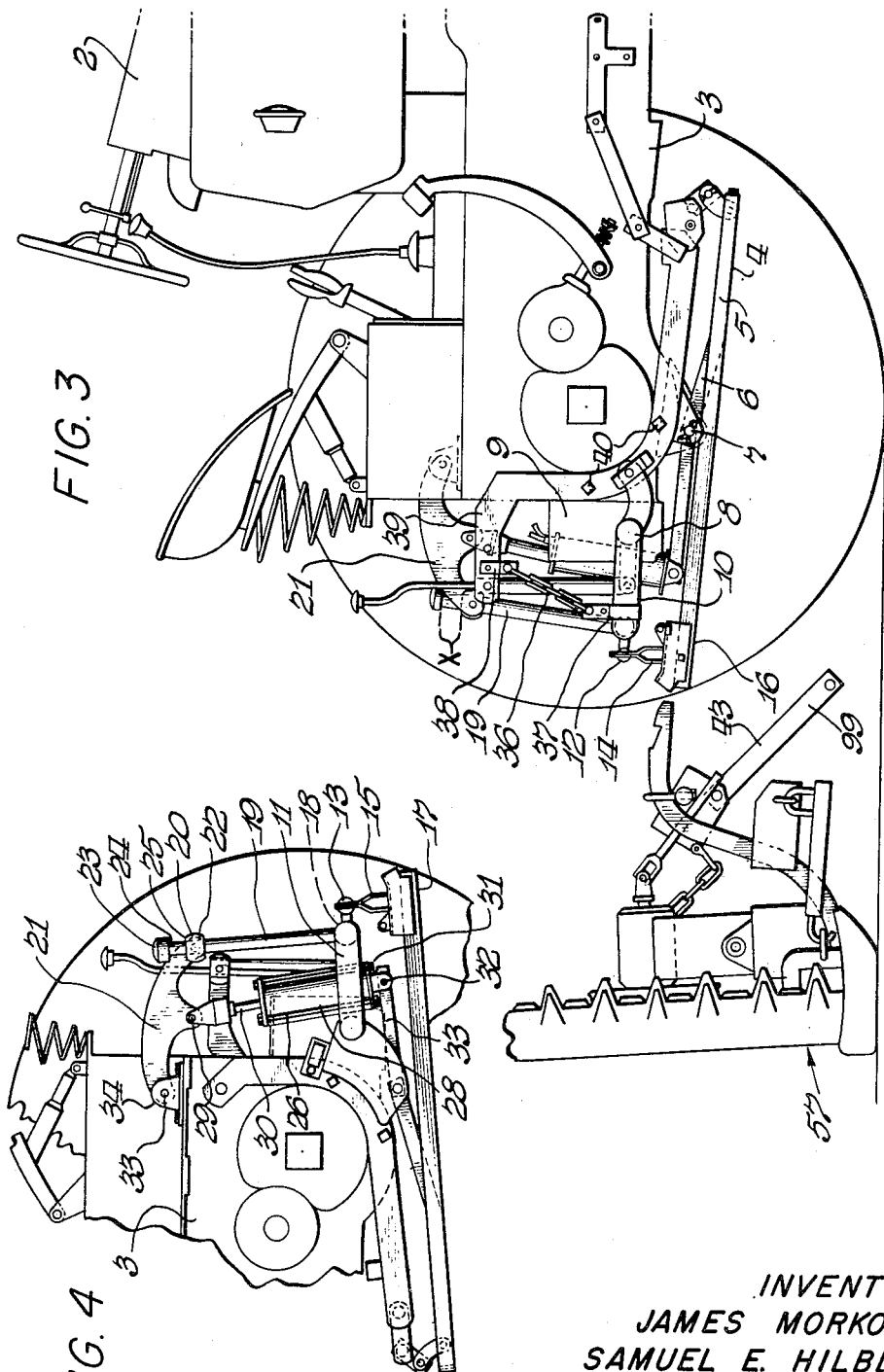
INVENTORS
JAMES MORKOSKI
SAMUEL E. HILBLOM
Paul O. Pippel
ATTORNEY

United States Patent Office 2,830,422
Patented Apr. 15, 1958

2,830,422

MOUNTING AND LIFTING MEANS FOR A TRACTOR MOUNTED MOWER

James Morkoski, Des Plaines, and Samuel E. Hilblom, Chicago, Ill., assignors to International Harvester Company, a corporation of New Jersey Application August 1, 1955, Serial No. 525,481

9 Claims. (Cl. 56—25)

This invention relates to moving machines and more specifically to improvements in mowing equipment which is mounted in trailing relation to an associated trailing and motivating tractor.

Mowing equipment of the type under consideration comprises a cutter bar assembly which extends laterally outwardly from one side of the tractor and generally parallel to the ground over which it is operated. The inner end of the cutter bar assembly comprises a coupling arm which is pivotally connected to the frame structure of the mower, the frame structure being connected and supported by the drawbar of the tractor. The coupling arm is pivoted to a mower bar which is adapted to be pivoted upwardly slightly before it is raised off the ground and operated in elevated positions in order to counteract the downward sag of the outer end of the mower bar so that it assumes a generally level position.

It is a principal object of the invention to provide improved means for gagging and lifting the mower bar assembly.

It is a further object of the invention to provide a novel mechanism for lifting and gagging the mower bar assembly and furthermore to arrange the mechanism so that the mower bar assembly may be gagged and lifted by the same power lifting device which in a subsequent stage of operation bodily lifts the entire mower machine for transport and the like.

These and other objects of the invention will become more apparent from the specification and the drawings, wherein:

Figure 2 is an enlarged fragmentary perspective view of a mowing machine and associated tractor and support structure;

Figure 3 is a fragmentary side elevational view of the structure shown in Figure 1 with the mowing machine shown disconnected from the tractor, and Figure 4 is a fragmentary side elevational view of the mechanism as seen from the opposite side to that shown in Figure 3.

Figure 1:
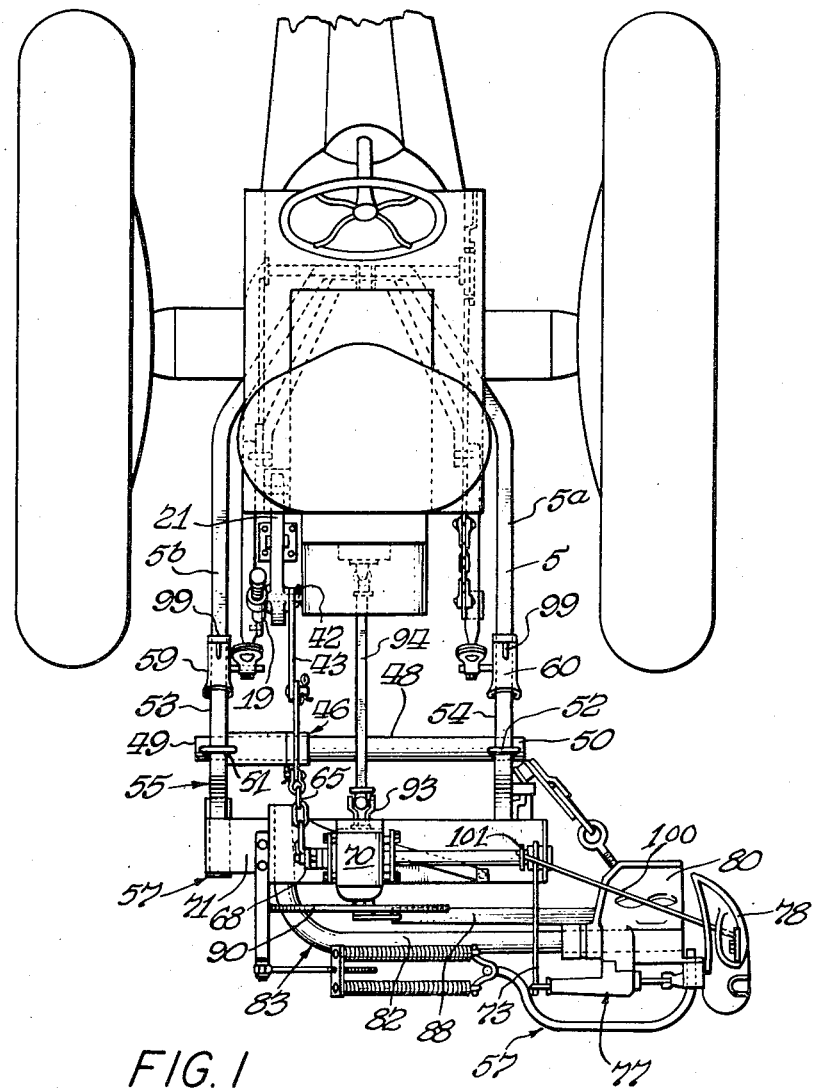
Figure 1 is a plan view of a mowing machine showing the latter attached to a conventional type of tractor which is fragmentarily shown.

Describing the invention in detail, the tractor generally designated 2 comprises a rear end portion 3 on which is mounted a hitch structure 4 of the type which includes a drawbar or bail 5 pivoted through a linkage 6 as at 7 for upward and downward swinging movement by the rockshaft structure 8 which is pivotally supported from the carriers 9 which are suitably bolted to the tractor axle housing, the rockshaft structure 8 including a pair of rearwardly extending arms 10 and 11 which at their rearward ends have ball joint connections at 12 and 13 to depending links 14 and 15 which are connected to the trailing ends 16 and 17 respectively of the legs or links of the bail 5.

The leg or arm 11 of the rockshaft is pivotally connected as at 18 to the lower end of a rod 19 which at its upper end has a lost motion connection with a swivel joint 20 and the swivel joint being pivotally mounted on the rear extremity of the lever assembly 21. The rod 19 is slidably related to the swivel joint 20 through the aperture 22 in the swivel joint or member 20 and the upper end of rod 19 is provided with a stop member 23 which is adapted to abut with its lower side 24 against the top side 25 of the swivel member 20 whereby the lever arm 21 is adapted to swing upwardly relative to the rod 19 as shown in Figure 4 until the swivel member 20 engages the member 23 and thereafter the lost motion connection or slack or first operating range identified X which is thus developed obtains a positive engagement so that actuation of the piston and cylinder assembly lifts and lowers the entire hitch or links 5a and 5b of the draft structure 5 in a second range of operation or stage which for the purpose of the instant disclosure includes that portion of the piston operation whereat the lever assembly 21, which is pivoted intermediate its ends as at 29 to the piston 30, operatively transmits force to the rod 19 that is beyond the extent of lost motion.

The lifting device 28 which comprises the cylinder 31, which at its lower end is connected as at 32 to a mounting member 33 on the tractor, has a first operating range or stage which comprises that portion of the piston stroke between the fully collapsed or telescoped position of the piston and cylinder assembly and the point at which the arm 21 tends to lift the rod 19 that is within the range of lost motion between the swivel 20 and the rod 19. It will be noted that the arm or lever 21 is pivoted in its forward end as at 33 to an anchor 34 on the rear end portion 3 of the tractor.

The hitching mechanism per se is not part of this invention and is claimed and disclosed in a co-pending application in the name of John R. Orelind entitled Tractor Attaching Structure, filed on February 25, 1953, Serial No. 338,651, now Patent 2,776,613.

The instant hitch does, of course, differ from the co-pending application in that the connecting rod 19 and the arm 21 have the lost motion connection therebetween and that the arm 10 of the rockshaft assembly (see Figure 3) is limited in its downward movement by means of a flexible chain assembly 36 which at its lower end is connected as by a clamp 37 to the arm 10 and at its upper end is connected by an anchor structure 38 to the anchor member 39 which is suitably connected as by bolt 40 to the adjacent portion of the tractor. The hitch is therefore limited in its downward movement and is unrestricted in its upward movement. In view of this movement, the piston and cylinder assembly is permitted extension and telescoping without influencing the position of the hitch within the limits of the lost motion between the arm 21 and the rod or connection 19.

Referring now more specifically to Figure 2, the arm 21 is connected at its rear end as by a pin 42 to the upper end of a link or strap 43 which generally parallels the rod 19. The lower end of the strap 43 is pivotally connected as at 44 to the outer end of the forwardly extending leg 45 of the bellcrank generally designated 46, said bellcrank being pivoted at its elbow as at 47 on a transverse axis afforded by generally horizontal shaft 48 over which the bellcrank lever or first lever 46 is sleeved and the shaft 48 being removably connected at opposite ends 49 and 50 as by U-bolt 51 and 52 to the fore and aft extending legs 53 and 54 of a first or main frame structure generally designated 55 of the mowing machine or mower mechanism generally indicated 57.

The forward ends of legs 53 and 54 are telescoped in sockets 59 and 60 which are provided on the rear ends of the links 5a and 5b of the drawbar 5 whereby the mowing machine and the hitch are interconnected as will be readily understood by those skilled in the art.

The bellcrank lever 46 has a downwardly extending leg

63. The lower end of leg 63 is pivotally connected as at 64 to a lost motion connecting means in the form of a chain 65 which at its forward end 66 is connected through a clamp 67' to said point 64 of the bellcrank lever 46. The chain 65 extends normally diagonally upwardly and rearwardly and at its rear end is pivotally connected as at 67 to an upwardly extending arm 68 of the rockshaft or second lever assembly 69 which is rockably supported through a carrier member 70 which is integrated with the cross beam 71 uniting the rear ends of the legs 54 and 53 of the main frame 55 of the mower. The rockshaft 69 includes a rearwardly extending lever arm 73 which at its rear end is pivotally connected as at 74 to the upper end of a flexible linkage in the form of a chain or pull member 75, the latter having its lower end pivotally connected as at 76 to the output end of the lever linkage generally indicated 77 which functions to gag and lift the cutter bar 76 about the pivot 79 which mounts the cutter bar from the yoke assembly 80 on the outer end of the coupling or supporting arm or second frame member 82 of the mower or cutter bar assembly generally designated 83 and the said coupling arm 82 having its inner end turned forwardly as at 84 and pivoting on the generally horizontal fore and aft rearwardly extending axis within a bearing 85 which is supported on the member 71 of the main frame 55.

It will be appreciated that the linkage 77 is of conventional construction which has been used in this art for many, many years.

It will also be understood that although the present invention is shown applied to a mower which is driven through a pitman 88 and the countershaft supported rotary crank assembly 89 which in turn is driven from the belt 90 and a driving wheel 92 which in turn is carried from the carrier 70 by a shaft 93 and suitably connected through universal shafting 94 to the power take-off shaft 95 of the tractor, that the invention is applicable to mowers which may be driven otherwise.

In operation, assuming that the mower is in its lowered position whereat the cutter bar assembly extends outwardly of the tractor and generally horizontally for operation over the ground, the operator in order to gag and lift the cutter bar actuates the lifting device to extend in the position shown in Figures 2, 3 and 4 so that the arm 21 is swung upwardly in a counter-clockwise direction (Figure 4). This develops an upward pull on the link 43 which in turn rotates the lever assembly 46 in a clockwise direction (Figure 2) with an initial tensioning of the chain 65 and thereafter swinging the motion multiplying means that is the arm 68 of the rockshaft assembly 69 in a counter-clockwise forward direction (Figure 2) whereupon the arm 73 raises upwardly and actuates the linkage 77 with consequent initial upward swinging of the cutter bar 78, as will be readily understood by those skilled in the art. Continued actuation of the lifting device, that is after predetermined upward tilting lift of the mower bar 78, effects an upward swinging of the entire cutter bar assembly 83 about the end portion of the coupling arm 82 about the axis of the end portion 84 whereby the entire cutter bar assembly is lifted.

Further continued actuation will transcend the lost motion between the members 19 and 20 and thereafter positively engage these members whereupon during the last stroke portion of the power device the force is transmitted to the drawbar and thereupon the entire mower mechanism is lifted upwardly by the bail.

For convenience in illustration it will be noted that in the views the mower bar is shown in upwardly folded position whereat it is held in said position by connector 100 which connects at one end to a ring 101 on the shaft 69 and the outer end of the connecting rod 100 is passed through an aperture in the cutter bar whereat outwardly of the bar it is provided with a removable threaded nut as will be readily understood by those skilled in the art.

In order to lower the entire mower structure the operator merely reverses the actuation of the lifting device through the hydraulic system shown at 93' which is conventional in the present-day tractors and the arm 21 swings downwardly, that is in a clockwise direction, (Figure 4), until the limit of the chain 36 is reached whereupon the hitch mechanism is prevented from swinging further downwardly. Thereafter the lifting device telescopes further and accommodates and causes a reversal of the movements previously described, that is the link 30 moves downwardly; the bellcrank 46 rotates in a counterclockwise direction; the rockshaft assembly 69 rotates in a clockwise direction and the arm 82 is swung downwardly initially and thereafter the force is translated through the linkage 77 and the mower bar swings about the axis 79 downwardly to its horizontal position.

It will be understood that the force exerted by the lifting device within the first operating range is below the weight load of the mowing machine and the associated hitch parts so that during upward actuation of the lifting device the mower machine is held down only by the weight resisting the upward force or thrust of the lifting device and the gagging and the lifting of the cutter bar assembly is accomplished within this period.

It will be noted that in order to disconnect the mower from the tractor all that is required is that the latches 99 be lifted as explained in the beforementioned application and that the upper end 99 of the link 43 be disconnected from the pin 42 whereupon the tractor may be pulled away from the mower. To re-couple the tractor is merely backed in so that the forward ends of the members 53 and 54 of the main frame enter into the respective sockets and the link 43 is connected to the pin 42.

What is claimed is:

1. A mounting for a mower on a tractor having a drawbar trailingly pivoted to its rear end portion on a generally horizontal axis for vertical swinging movement, the combination of means operatively associated with the tractor and the drawbar for limiting downward movement of the drawbar and accommodating unrestricted upward movement thereof, a power device on the tractor for lifting said drawbar, a lost motion connection between said power device and said drawbar, said power device having a first operating range coextensive with the extent of said lost motion without lifting said drawbar and having a second operating range for lifting said drawbar through said connection, and a mower assembly having a first frame connected to said drawbar for haulage as well as for bodily lifting and lowering by the same, a second frame including a laterally-extending supporting arm pivoted on the first frame and swingable about a rearwardly extending axis between a normal lowered position in which the lower end of the arm is closely adjacent to the ground and an elevated position in which the arm extends generally horizontally, a mower bar carried by said arm and projecting laterally from the lower end of the latter, and mechanism inter-connecting said power device with said second frame for effecting an upward swing of said second frame and its attached mower bar with reference to said first frame and about the pivot connection between said frames in response to lifting actuation of said power device in said first range, and said power device operative to lift said drawbar and said mower assembly bodily in response to lifting actuation of said power device in said second range.

2. In a mower attachment for a tractor having a draft structure trailingly pivoted on its rear end portion for vertical swinging movement, the combination of a power lift device on the tractor having a lost motion connection with said draft structure and operative in a first lifting and lowering range in the extent of said lost motion free of said draft structure and in a second lifting and lowering range through said connection beyond its extent of lost motion to raise and lower said draft structure, a mowing machine having a frame movably carried by the draft structure and having a cutter bar assembly, a pivotal mounting for the cutter bar assembly on the frame enabling vertical swinging movement of the cutter bar assembly, connecting means between the power device and the cutter bar assembly for swinging the cutter bar assembly in an upward direction in response to operation of said power device in the first lifting range and for lowering said cutter bar assembly from its lifted position attendant to lowering operation of said device in said first operating range, said power device operative in said second range to lift and lower said mowing machine bodily up and down attendant to and with the lifting and lowering of said draft structure and while maintaining said cutter bar assembly in lifted position.

3. The invention according to claim 2 and said mowing machine comprising a frame connected to said draft structure for haulage as well as bodily lifting and lowering thereby, and said connecting means including a rockshaft rotatably connected to the frame on a generally horizontal axis extending transversely of the tractor and means including a first and second lever arm connected to the rockshaft and flexible means connecting said first arm to said mower assembly and said second arm to said power device.

4. In a mower attachment for a tractor having a drawbar trailingly pivoted on its rear end portion for vertical swinging movement, a power lift device mounted on the tractor, a lost motion connection between said device and said drawbar whereby said device has a first operating range independent of the drawbar and a second operating range beyond the extent of said lost motion for lifting and lowering the drawbar in toto, the combination of a frame, means detachably connecting said frame to said drawbar for haulage thereby as well as for bodily lifting movement by the same, a first lever pivoted on said frame to rock fore and aft thereon, means connected to said tractor and to said drawbar for limiting downward movement of the drawbar and accommodating unrestricted upward movement thereof, means for rocking said first lever as an incident to operation of said device in said first range and including a link connected at one end to said first lever and means connecting the other end of the link to said power device, a mower bar projecting laterally from said frame structure and pivoted thereto for vertical swinging movement, a second lever carried by the frame to rock fore and aft and operatively connected to said first lever for actuation thereby, and means operably connecting said second lever to said mower bar for swinging the same attendant to said second lever being rotated by the first and the first being rotated by said device operating in said first range.

5. In a mower attachment for a tractor having a draft structure and having provision for supporting said structure for vertical movement, a power device comprising a piston and cylinder assembly supported on the tractor, a lost motion connection between said structure and said piston having a slack range whereby said assembly is accommodated a limited stroke portion without actuating said structure incidental to said structure being disposed in a lowered position thereof and said assembly having a further stroke portion for lifting and lowering said structure, a mowing machine comprising a frame carried by the structure and having a cutter bar assembly, a pivotal mounting for the cutter bar assembly on the frame enabling vertical swinging movement of the cutter bar assembly upwardly and downwardly respectively to and from a substantially horizontal position, means comprising a connection between the piston and said cutter bar assembly for swinging the cutter bar assembly in response to actuation of said piston and cylinder assembly attendant to operation of the piston and cylinder assembly in said first stroke portion, said piston and cylinder assembly operative to bodily lift and lower said structure and said mowing machine in said second stroke portion while maintaining said mower assembly in lifted position.

6. A mower attachment for a tractor having a hitch mounted thereon comprising a drawbar trailingly pivoted to said tractor for vertical swinging movement and a lever having one end pivoted to the tractor and extending rearwardly therefrom over the drawbar and a piston and cylinder lifting device having said cylinder connected to the tractor and said piston connected to the lever intermediate its ends, and a lost motion connection between the other end of said lever and said drawbar and said device having a first operating stage within the limit of said lost motion for operation without actuating said drawbar and having a second operating stage beyond the extent of lost motion for lifting and lowering the drawbar, a mowing machine including a frame carried by the drawbar, an arm pivotally attached to the frame and extending laterally, a cutter bar assembly pivotally attached to the outer end of said arm for angular movement relative thereto, a pull member depending from said frame for movement upwardly relative to said arm and cutter bar assembly, means on said arm to which said pull member is directly attached to first swing said cutter bar assembly upwardly relative to said arm and then swing said arm upwardly with said assembly about said pivotal attachment of the arm to said frame, and mechanism operatively associated with said pull member and mounted on the frame and including linkage operatively interconnecting said pull member with said lever, said mechanism being adapted upon actuation of said lifting device in said first stage to draw upward on said pull member to raise and lower said cutter bar assembly and said arm and to hold the same in such position attendant to the said lifting device operating in said second stage and bodily lifting and lowering said mowing machine with said drawbar.

7. The invention according to claim 6 and said second-mentioned mechanism including a second lever pivoted on the frame to rock fore and aft and having one leg connected to said pull member, and motion-multiplying means operatively connecting the other leg of said second lever to said link.

8. The invention according to claim 7 and said motion-multiplying means comprising another lever pivoted on the frame to rock fore and aft and a lost motion connection between one leg of said third lever and said other leg of said second lever and a connection between said link and the other leg of said third lever.

9. A mower attachment for a tractor provided with a pair of laterally spaced draft links pivotally attached thereto, and a power lift therefore having a lost motion connection therewith whereby said lift has a first operating range independent of said draft links and a second range for lifting and lowering said links, said attachment comprising a frame detachably connected to the free ends of said links to be carried thereby, a cutter bar assembly pivotally attached to the frame for angular movement relative thereto, means comprising a lifting linkage connecting said lift and said cutter bar assembly for lifting and lowering said assembly as an incident to operation of said lift in said first range, said lift formed and arranged to raise said cutter bar assembly and then while maintaining the same in raised position to bodily lift said frame and cutter bar assembly and to lower the same bodily and thereafter lower said cutter bar assembly.

References Cited in the file of this patent

UNITED STATES PATENTS

| | | |
|---|---|---|
| 2,269,982 | Mott | Jan. 13, 1942 |
| 2,387,070 | Hilblom | Oct. 16, 1945 |
| 2,533,804 | Hitchcock | Dec. 12, 1950 |
| 2,610,560 | Coultas et al. | Sept. 16, 1952 |
| 2,616,234 | Love | Nov. 4, 1952 |
| 2,617,242 | Iverson | Nov. 11, 1952 |
| 2,779,145 | Smith | Jan. 29, 1957 |